United States Patent [19]

Morey et al.

[11] Patent Number: 5,138,957
[45] Date of Patent: Aug. 18, 1992

[54] HOT GAS GENERATION SYSTEM FOR PRODUCING COMBUSTIBLE GASES FOR A BURNER FROM PARTICULATE SOLID ORGANIC BIOMASS MATERIAL

[75] Inventors: Norval K. Morey, Weidman; Robert J. Engler, Mt. Pleasant, both of Mich.

[73] Assignee: Biotherm Energy Systems, Inc., Winn, Mich.

[21] Appl. No.: 700,242

[22] Filed: May 15, 1991

[51] Int. Cl.$^5$ ............................................. F23B 7/00
[52] U.S. Cl. ........................................ 110/234; 48/111;
48/209; 110/110; 110/171; 110/188; 110/214;
110/229; 110/247; 110/259; 110/346
[58] Field of Search ............... 110/110, 229, 346, 234,
110/211, 214, 188, 190, 247, 259, 165 R, 171;
48/209, 111

[56] References Cited

U.S. PATENT DOCUMENTS

| 4,672,899 | 6/1987 | Kainer | 110/229 X |
| 4,848,249 | 7/1989 | LePori et al. | 110/234 |
| 4,987,115 | 1/1991 | Michel-Kim | 110/229 X |

Primary Examiner—Edward G. Favors
Attorney, Agent, or Firm—Learman & McCulloch

[57] ABSTRACT

A bottom-feed, biomass material gasification system feeds fuel such as green and wet woodchips from below up through a central opening in a stationary, perforate fire table which supports the mound-like fuel bed which is formed. A plurality of ring-like air manifolds contiguously below the fire table, and surrounding the fuel supply tube are separately provided with air in a controlled manner according to the demand for the combustible gas produced, and a greater volume of air is supplied to the centralmost manifold, than to the outer manifold, or manifolds. The system includes, in addition to a primary heating chamber, a secondary heating chamber which receives the hot gases generated in the primary chamber and, via a centrifugal cyclonic action, combusts fly ash particles which may remain entrained in the gas, before passing the hot gases to the boiler burner for cumbustion. The atmosphere in the primary combustion chamber is partially starved, insofar as the supply of oxygen is concerned, and is maintained under a lower pressure than the gases which outlet from the primary chamber to the secondary chamber so that there is a continuous suction or draft pulling the hot gases generated in the primary chamber directly to the secondary chamber. An ash disposal system has paddles mounted on a rotary band bearing on the fire table for moving the ash which is generated from the perimeter of the fire table, when the ash build-up is sufficient to warrant it.

23 Claims, 5 Drawing Sheets

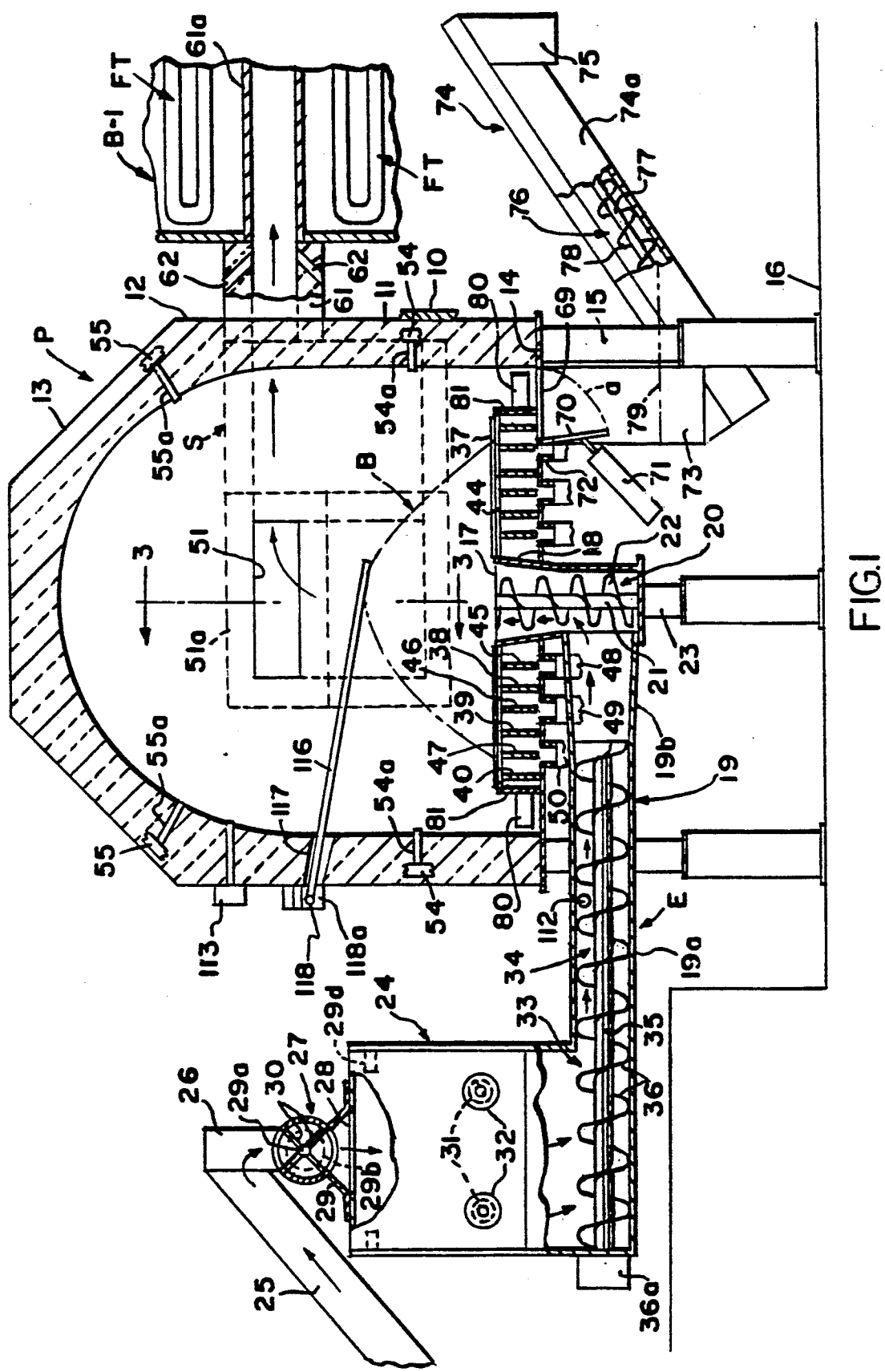

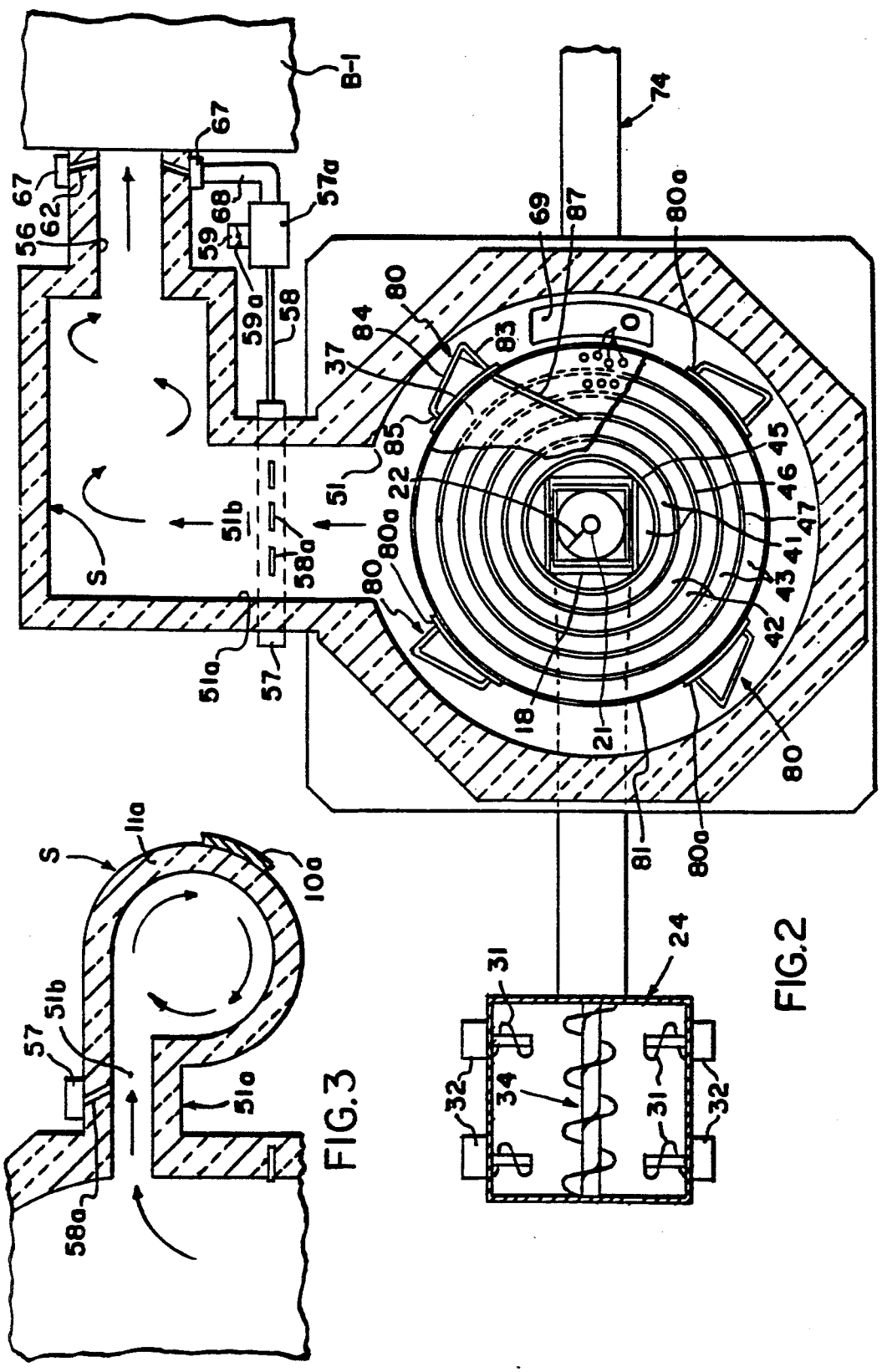

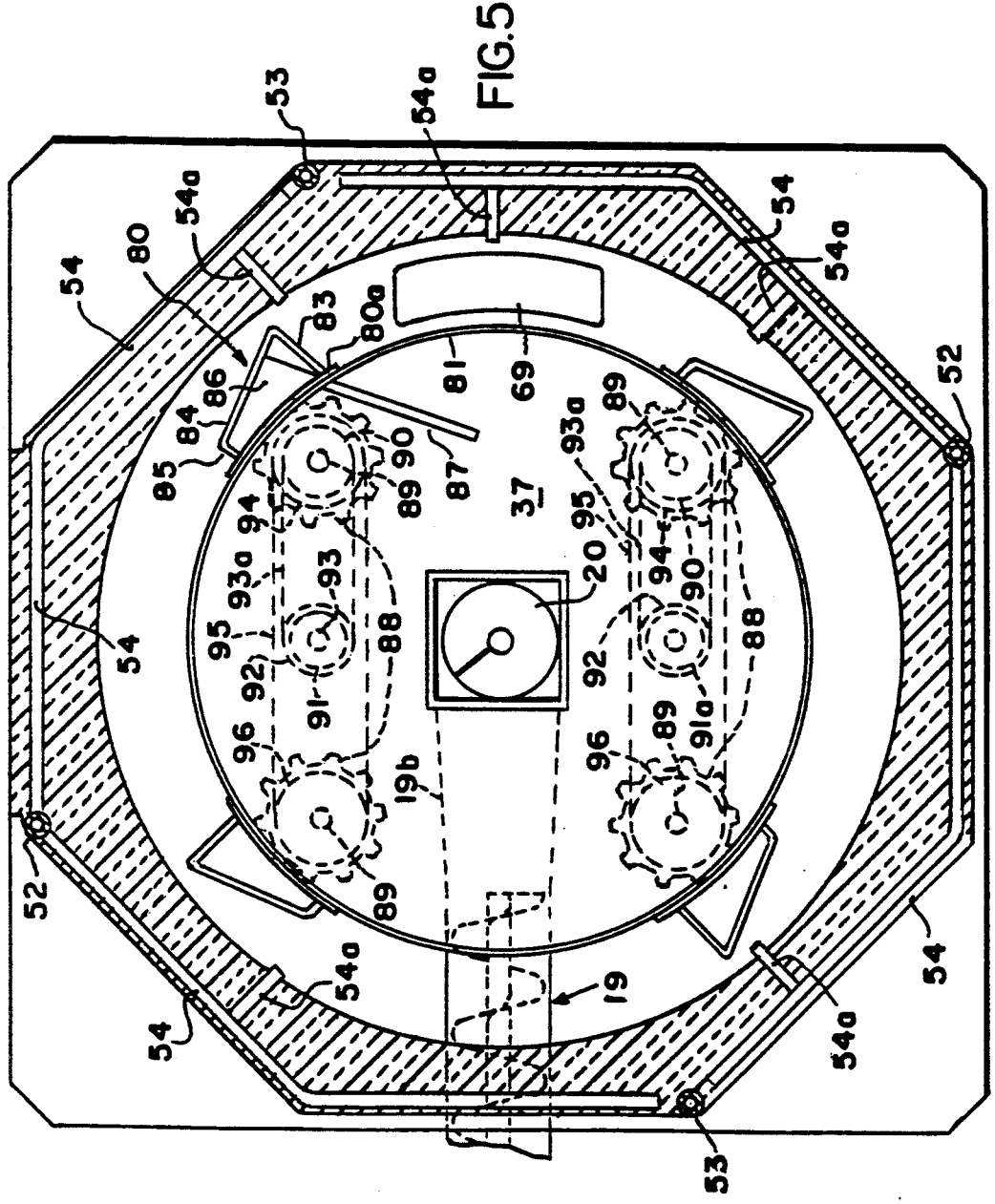

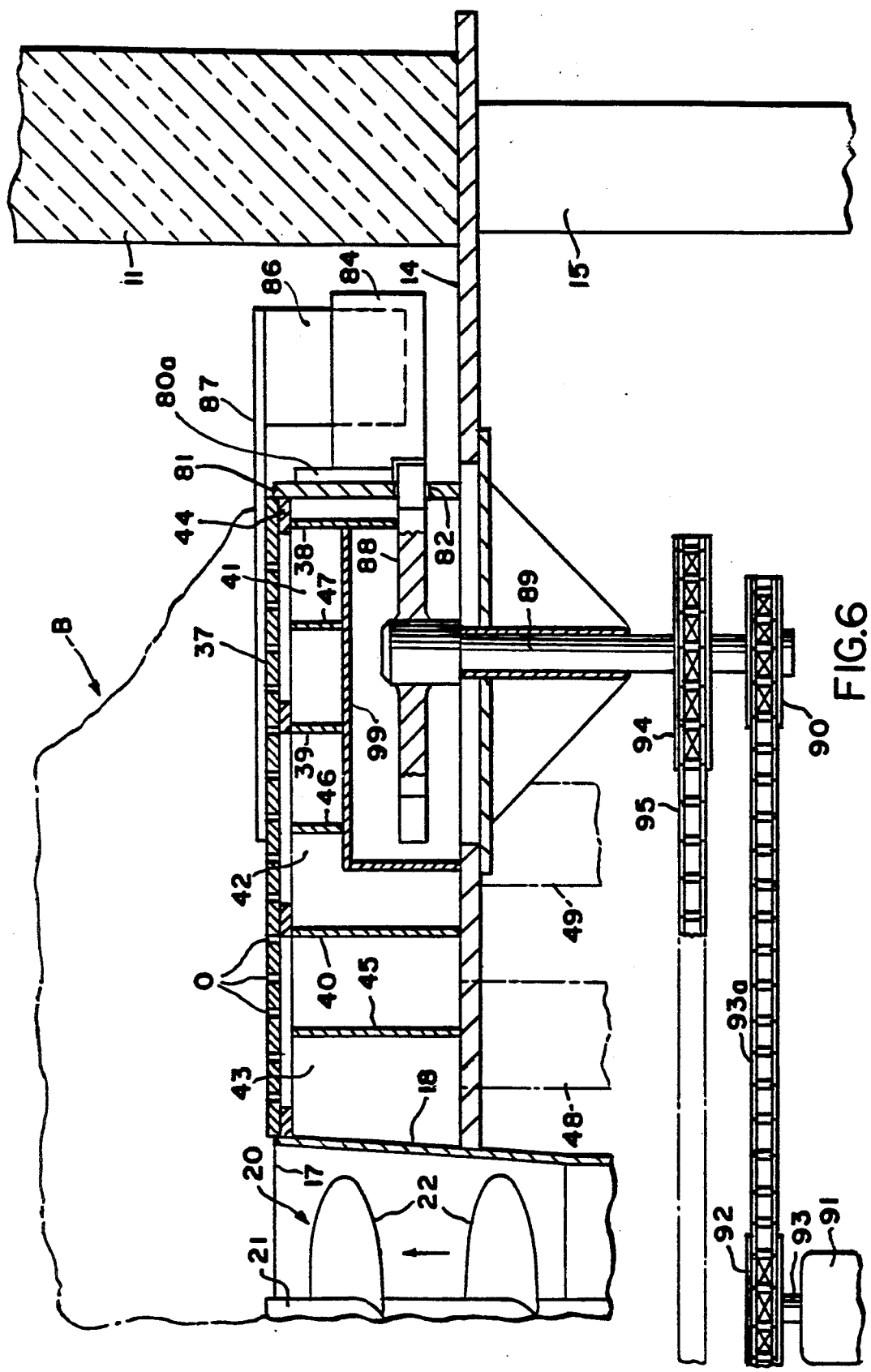

HOT GAS GENERATION SYSTEM FOR PRODUCING COMBUSTIBLE GASES FOR A BURNER FROM PARTICULATE SOLID ORGANIC BIOMASS MATERIAL

BACKGROUND OF THE INVENTION

The present invention is directed to a hot gas generation system for producing combustible gases which can be burned for heating boiler water or other thermofluids such as oil to be circulated through heating systems in plants and the like, or which can be used in the production of electrical power, or to furnish steam for various industrial and commercial purposes such as lumber drying, canning, and many other purposes. Various prior art gasifiers for burning high moisture content, organic biomass materials such as wood chips and garbage have been proposed, and are illustrated in a number of the following prior patents:

| | |
|---|---|
| 3,818,848 | Gardner |
| 3,999,744 | Kotch |
| 4,184,436 | Palm et al |
| 4,300,456 | Messersmith |
| 4,308,034 | Hoang |
| 4,388,082 | Guttmann et al |
| 4,424,755 | Caffyn et al |
| 4,480,557 | Hochmuth |
| 4,583,992 | Rogers |
| 4,601,730 | McGowan et al |
| 4,627,367 | Butt |
| 4,691,846 | Cordell et al |
| 4,716,842 | Williams |
| 4,747,355 | van Berkum |
| 4,803,836 | Blanton et al |
| 4,900,401 | Horton |
| 4,947,769 | Whitfield |
| 4,971,599 | Cordell et al |
| 1,846,477 | D. Dreier |
| 4,465,022 | Virr |
| 4,593,629 | Pedersen et al |
| 4,531,462 | Payne |
| 2,088,679 | K. Yamazaki et al |
| 1,888,585 | W. B. Chapman |

U.S. Pat. No. 2,088,679 discloses a system in which fuel is supplied into the bottom of a gasifying retort surrounded by a grate, and combustible gases are recirculated through the retort to enhance the oxidation of the fuel bed. U.S. Pat. Nos. 4,691,846 and 4,971,599 disclose a similar gas generation system for producing gases for boiler water heating purposes. In this system, combustible gases are said to be recirculated back down through the mass of burning material to enhance the combustion thereof.

One of the prime objects of the present invention is, in contrast, to avoid the recirculation of gases through the bed or mass of biomass material and to direct the gases given off instead to a secondary heating chamber without combusting more than enough of them in the primary chamber to maintain the desired temperature in the primary heating chamber. The present invention seeks to minimize the non-useful combustion of gases produced by incompletely combusting biomass material in the bed and instead seeks to maximize gas production by the bed. In the applicants' system, incomplete combustion in the central portions of the bed interior produces large volumes of burnable gases, while complete combustion occurs only at the exterior surface portions of the bed and at the perimetral portions of the bed to reduce the remaining carbons in these portions to ash.

Other patents, such as Caffyn et al U.S. Pat. No. 4,424,755, in a different incineration process, also pass the gases of combustion to a secondary chamber wherein there is a separation of particulate matter from the gases. While the present system also uses a cyclone-type secondary heating chamber, it seeks to combust the fly ash particulates entrained in the gases in a secondary cyclone chamber having walls heated sufficiently to combust the particulates, without undue burning of the combustible gases from which they are separated.

The Whitfield U.S. Pat. No. 4,947,769 discloses a system for the combustion of solid particulate fuel which utilizes a perforate fire table. The table is supplied with fuel from above and employs a rotating member above the grate to remove ash and clinkers from the grate.

The Butt U.S. Pat. No. 4,627,367, is directed to a coal-burning, gas generating apparatus in which fuel from above is supplied to a coal bed which is fluidized due to the supply of air under considerable pressure to the lower end of the coal bed. In contrast, the present invention seeks to avoid the fluidization of the mound-like bed, while furnishing greater volumes of air to the central portion of the bed than to the perimeter thereof.

SUMMARY OF THE INVENTION

The present invention is directed to a bottom-feed, gasification unit in which fuel such as green and wet woodchips, or green and wet woodchips mixed with high moisture content garbage and refuse, is fed from below to the level of a stationary, perforate fire table which supports the mound-like, continuously renewing fuel bed which is supported thereon. A plurality of ring-like air manifolds, beneath the fire table are separately provided with air in a controlled manner, and greater volumes of air are supplied by the centralmost manifold, than by the outer manifold, or manifolds. The system includes, in addition to a primary heating chamber, a secondary heating chamber which receives the hot gases generated in the primary chamber and, via a centrifugal cyclonic action, combusts fly ash particles which may remain entrained in the gas, before passing the hot gases to the boiler burner for combustion. The atmosphere in the primary combustion chamber is partially starved, insofar as the supply of air and oxygen is concerned, and the secondary chamber is maintained under a lower pressure than the gases which outlet from the primary chamber to the secondary chaber so that there is a continuous suction or draft pulling the hot gases generated in the primary chamber directly to the secondary chamber.

A unique ash disposal system is utilized with the fire table structure for moving the ash which is generated from the perimeter of the fire table, and the floor below and surrounding the fire table, in a safe and efficient manner, when the ash build-up is sufficient to warrant it. Further, structure is provided for avoiding the backflow of smoke and gases through the fuel supply system. The system has been demonstrated to be more efficient than prior systems, and capable of effectively burning relatively wet fuels.

One of the prime objects of the present invention is to design a more efficient method of generating a greater volume of hot combustible gases from a given supply of biomass fuels which may contain a considerable amount of moisture in the neighborhood of, for example, 45%–60% by weight.

Another object of the invention is to provide a system of the character described which has very low emissions of particulate, and meets federal, state and local legislated standards with regard to all emissions.

Still another object of the invention is to utilize otherwise wasted fuels which do not, in useful combustion, create additional "green-house-effect" problems.

Still another object of the invention is to design a system which can be simply constructed in modular form, so as to be readily and economically installable at low cost.

Another object of the invention is to provide a low complexity system which has few moving parts, and, for this reason, is inexpensive and easy to maintain.

Still another object of the invention is to design a system which, in combination with deterring the formation of clinkers incorporates an easy and safe ash disposal process which is operable during gasification, to thereby eliminate down-time when ash and residuals are being removed from the primary heating chamber.

Still another object of the invention is to provide a gas generation and combustion system in which the hot gases produce an even heat at the boiler, and the system can be readily regulated to continuously maintain that level of heat, according to the temperature of the heated water in the boiler, the content of the stack emissions, or in other manners associated with gas demand.

Other objects and advantages of the invention will be pointed out specifically or will become apparent from the following description when it is considered in conjunction with the appended claims and the accompanying drawings.

DESCRIPTION OF THE DRAWINGS

In the drawings, FIG. 1 is a schematic, partly sectional, side elevational view of the gas generating system, the chain lines indicating the bed of biomass material which is formed and maintained on the perforate fire table and the arrows indicating the direction of gas flow;

FIG. 2 is a schematic sectional, top plan view;

FIG. 3 is a fragmentary, transverse, schematic, sectional view, taken on the line 3—3 of FIG. 1;

FIG. 5 is an enlarged, fragmentary, schematic, sectional plan view illustrating the drive system for the ash disposal elements;

FIG. 5A is an enlarged, fragmentary perspective view of a portion of the ash disposal paddle mounting band;

FIG. 6 is an enlarged, fragmentary, schematic side elevational view illustrating more particularly the construction of the bed-supporting fire table and the ash removal scraper which is carried by one of the ash conveying paddles.

Figure 4:
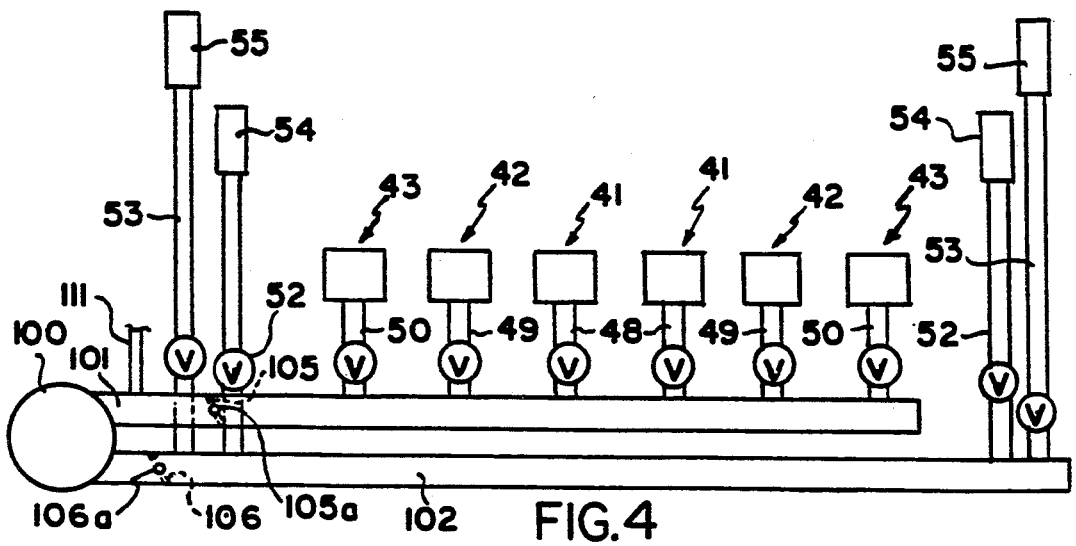
FIG. 4 is a schematic air supply diagram.

Referring now more particularly to the accompanying drawings, and in the first instance to FIGS. 1 and 2, a primary heating chamber is shown at P as being constructed of an outer shell 10 of steel and a liner 11 of refractory brick. The brick or refractory 11 can be a low alumina, refractory material such as supplied by General Refractories of Pittsburgh, Pa. The refractory material is capable of resisting acids which may be emitted from the biomass material being treated, and is further capable of a heat-sink function in the sense of storing heat which is generated in the primary chamber.

The primary chamber P may take any form, but, preferably, is shown as a generally hexagonal structure having a side wall 12 formed of a plurality of hexagonally arranged, side wall portions. The roof 13 of the primary heating chamber curvilinearly converges in an upward direction, as shown, but may be flat. The bottom of the chamber 12 is closed by a steel floor plate 14 which is supported on legs 15 from the floor 16 of the building in which the system chamber is located.

Figure 7:
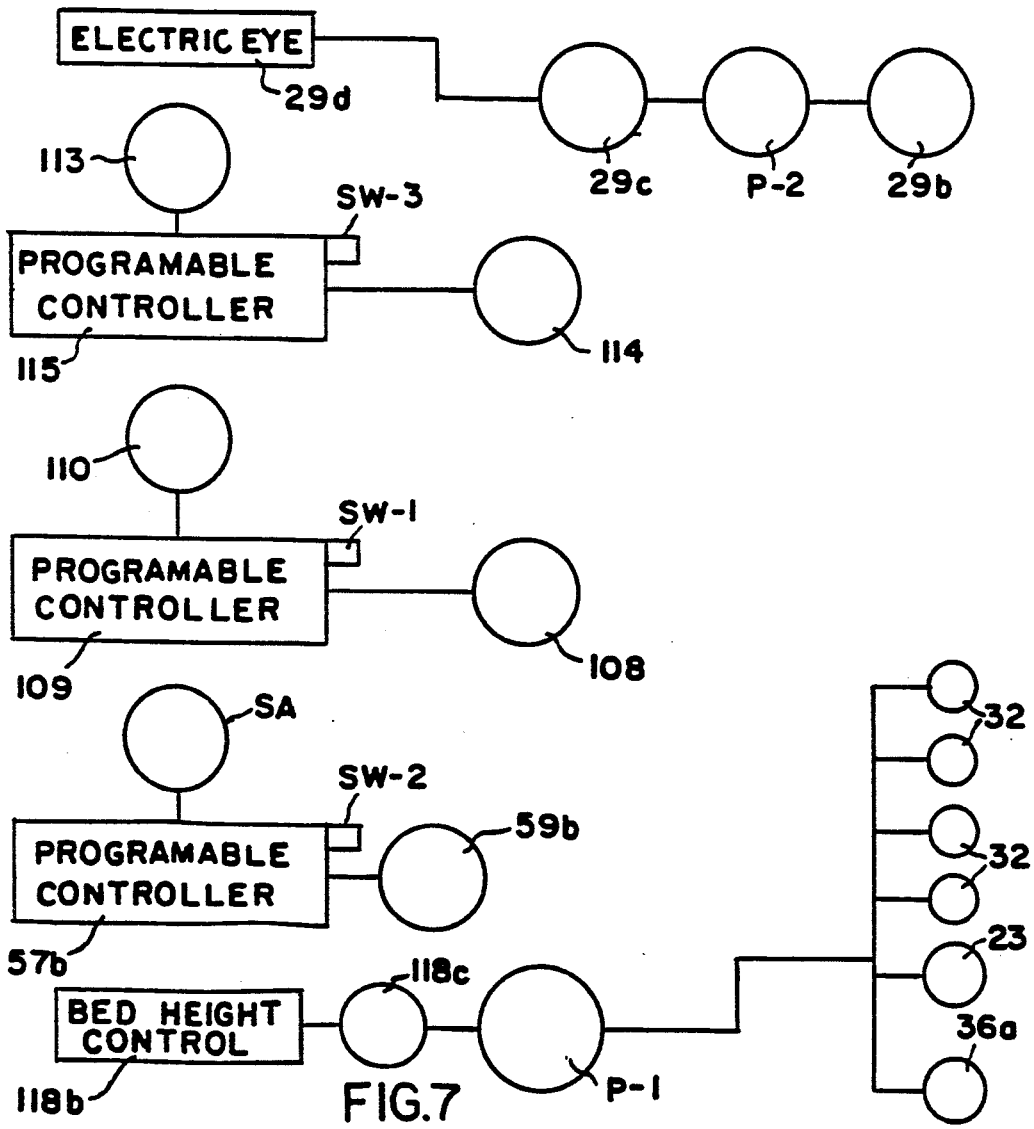
FIG. 7 is a schematic control diagram for the system.

A square opening 17 is provided centrally in the plate 14 to receive an upwardly divergent, vertically extending tubular portion 18 of square cross-section which joins to one end of a generally horizontally disposed, fuel-supplying conveyor, generally designated 19. A vertically disposed auger member, generally designated 20, is situated in the tubular portion 18. The auger 20 comprises a shaft 21 mounting a helical flight 22, and is driven by a suitable hydraulic motor 23 (FIG. 7) or the like at a controlled rate of speed. The divergence of the chamber 18 permits the shaft 21 to travel with less torque, and eliminates the bridging or jamming which might occur if the enclosure were a tightly fitting auger enveloping cylindrical enclosure.

The enclosed fuel-supplying conveyor 19 leads from a hopper or bin enclosure, generally designated 24, which may be of any suitable dimension to hold an adequate volume of wood chips or other biomass material, or mixtures thereof. The volume is such as to insure a constant and steady feed of wood chips in a continuous manner to the primary heating chamber P. The hopper 24 may be fed from a conveyor 25 which incorporates a flighted auger, or chain driven paddle conveyor for supplying chips to a bonnet 26 above the hopper 24. The bonnet 26 empties into a slowly revolving rotary, air-lock valve device, generally designated 27, which feeds an opening 28 in a frustoconical portion 29 of the upper end of hopper 24. The valve 27 comprises a cylindrical chamber wherein an axial shaft 29a, having four radial paddles 30 fixed thereto, continuously revolves to feed or admit chips to the interior of the hopper enclosure 24. The exterior ends of the paddles 30 are preferably formed of a rubber material, and it should be noted that the opening 28 is always isolated from the bonnet 26 by two of the paddles 30 so that the upper end of hopper 24 is virtually sealed. A rotary hydraulic motor 29b (FIGS. 1 and 7), driven by a hydraulic pump P-2 via an electric motor 29c controlled by an electric eye 29d in bin 24, which keeps the bin 24 filled to a particular level, drives the shaft 29a.

Also, provided in the interior of hopper 24, to prevent any tendency of the wood chips to bridge in the hopper 24, are a series of motor-driven augers 31, revolved by hydraulic motors 32 which are driven by the same pump P-1 which drives motor 23. The lower end of hopper 24 is open to the conveyor 19, as indicated at 33, and an auger conveyor, generally designated 34, extends from the lower end of the hopper 24, as indicated in FIG. 1, into and along the enclosure E of conveyor 19. The enclosure E comprises a linear portion 19a of square cross section, leading to a divergent portion 19b, which also is of square cross section throughout its length, and which is open at both ends. The auger conveyor 34, which comprises a shaft 35 and a helical flight 36, extends only to the end of the portion 19a of the conveyor enclosure E as shown, but may be extended further for processing certain types of fuel. The shaft 35 is driven by a hydraulic motor 36a, supplied with oil by the same pump P-1 which drives the shaft 21, and the augers 31. The pump P-1 is a variable displacement pump which is controlled by the level of the bed B of biomass material, in the primary heating chamber P in a manner which will presently be described.

Provided at the upper end of the chip feed chamber 18, and fixed thereto, is a perforate, circular, stainless steel, bed-supporting fire table 7. The table 37 may be formed of segments to facilitate replacement of only those portions which need replacement at any one time. The table 37 is provided with multiple perforations in the nature of openings O, typically 5/16 inches in diameter, which are relatively closely spaced apart over the entire upper surface of the table 37, i.e., in the nature of 2 inches apart in the table 37. The fire table 37, which, as indicated, may be constructed modularly of a plurality of pieces, is partly supported from the floor 14 of the primary heating chamber P by a series of annular partitions 38, 39 and 40 which provide a centralmost annular manifold 41, a middle annular manifold 42, and an outer perimetral manifold 43. The partitions 38-40, which air keeps ash from falling into manifold weld to the floor 14 of the primary chamber P, have support structure, including annular bars 44, welded to them and to which the bed supporting table 37 is fixed as by bolting or in any other suitable manner. Provided within each of the manifold chambers 41, 42 and 43 to also perform a table support function are dividers or partitions 45, 46 and 47 which also weld to the floor 14. These partitions 45-47 are cut away or notched at their lower ends where air supply pipes 48, 49 and 50 lead into the manifold chambers 41, 42 and 43 respectively to admit air to these annular chambers on both sides of the divider partitions. The walls 45, 46 and 47 and the walls 38, 39 and 40 are imperforate so that the chambers 41, 42 and 43 are sealed except at their upper ends where they admit air through the perforations O in the bed-supporting table 37. The air flow functions to prevent particulates from falling through to the manifolds 41-43 in addition to supplying oxygen to promote the incomplete combustion which is desired in the interior of bed B. As will become apparent later on, the supply of air through the pipes 48, 49 and 50 is closely regulated to supply a much greater volume of air to the centralmost chamber 41 which is passed in that volume through to the centralmost portion of the fuel bed, a lesser volume of air to chamber 42 which is then passed in that volume to the annularly intermediate portion of the fuel bed, and a still lesser volume of air to chamber 43 which is then passed in that volume to the outer peripheral portion of the fuel bed. The amount of air supplied is only such as to provide sufficient oxygen to create gas production in the smoldering bed B, which ideally is flaming evenly only along its outermost layer. Typically, the air volume supplied to chamber 42 will be only two-thirds of that supplied to chamber 41 and the air volume supplied to chamber 43 will be much less, i.e., one-third the volume supplied to chamber 41. The gases given off, principally from near the upper surface of the bed B, move upwardly to a location generally opposite the outlet opening 51 which is provided in the primary chamber P. They are mixed with only sufficient air, in a manner to be described, to combust only that small portion of them which will maintain the temperature of the atmosphere in the primary chamber P above bed B opposite opening 51 in the neighborhood of 1200°-1300 degrees F. Air to support this very limited combustion of the generated gases is supplied through sets of pipes 52 (FIG. 4) and pipes 53, to separate lower manifolds 54 and upper manifolds 55, respectively, which communicate with the interior of chamber P via a multiplicity of circumferentially spaced passages 54a and 55a respectively. While only several passages 54a are shown in FIG. 5, it should be understood that both groups of passages 54a and 55a are relatively closely spaced apart to distribute the air evenly. The manifold system 54 is particularly illustrated in FIG. 5 and it is to be understood the manifold system 55 is of similar configuration.

The bed B essentially smolders and the incomplete combustion which occurs in the body of bed B is responsible for giving off the incomplete products of combustion i.e., the smoke-like products with some entrained fly ash, which later are to be burned outside the primary heating chamber P. It is to be remembered that the bed B is comprised of green and wet wood chips, which may contain moisture in the range of 30% to 60% moisture by weight. The air volumes moving up into bed B from annular chambers 41, 42 and 43 are not delivered at a pressure which fluidizes the bed, or even causes the light char at the perimeter of the bed to become airborne, however, the pressure of this air, which may be in the neighborhood of 2-3 P.S.I. in the chambers 41, 42 and 43 is such as to prevent any recirculation of gases into the bed B because the pressure of the atmosphere in the primary chamber P above the bed B is maintained in the neighborhood of one half P.S.I. by restricting the total volume of air supplied to the primary chamber P.

The outlet opening of rectangular cross section 51, in the side wall of the primary chamber P, leads to a tubular section 51a (FIGS. 2 and 3) having a mating passage of rectangular cross section leading to the cylindrical wall of a cyclone secondary heating chamber generally designated S. As will be seen in FIG. 2, the gases are delivered to one end of the circular cyclone chamber S, which is of considerably greater volume than passage 51b. The gases must gradually turn through a ninety degree angle (FIG. 2) as they whirl from tubular sections 51a to an exit opening 56 of reduced diameter, located axially at the opposite end of the cylindrical cyclone chamber S.

As FIG. 3 demonstrates, the throat section 51a leads into the upper end of the cyclone chamber S in a manner to promote the whirling of the gases which, as later will appear, via centrifugal force, causes gas-entrained fly ash to proceed outwardly to the hot internal wall of the secondary chamber S, and to be combusted to gas there as they contact the wall. The throat section 51a, and secondary heating chamber S, may be constructed in the sam manner as the primary chamber P, of an outer steel shell 10a and an inner refractory material 11a. Provided in this throat section 51a to supply sufficient air to support the limited combustion of the gases, and the virtually complete combustion of the fly ash, which occurs in secondary chamber S, is an air manifold 57 which receives air from a blower fan 57a and transmits it via a supply pipe 58 to the passage 51b via a series of circumferentially spaced openings 58a provided in the throat section 51a. The fan 57a has an inlet pipe 59 controlled by an adjustable, revolvable damper 59a to meter the amount of air which is admitted to the manifold 57. Damper 59a is revolved by a conventional electrical motor 59b.

Typically, the pressure in the manifold 57 will be in the nature of 1½ P.S.I. to create a differential pressure between the primary and secondary chambers, and the air being admitted through passages 58a will exert a venturi draw on the gases in the primary chamber, both the differential pressure and the venturi draw pulling the gases from the area above the bed B without permitting a recirculation which would promote their combustion. This draft or suction is further enhanced by the stack effect of the boiler stack.

From the cyclonic secondary heating chamber S, the gases proceed to a steel encased, refractory throat section 61 which leads to the typical fire tube boiler generally designated B-1. While a hot water boiler B-1 is indicated in the drawings, it should be appreciated that the section 61 which leads from the cyclone chamber S could be supplying combustible gases to many forms of burners or equipment in which these gases could be combusted. The boiler which is illustrated is a typical heat exchange vessel which includes a central burner tube 61a, communicating with the throat section 61. Central burner tube 61a which is surrounded by water leads to fire tubes FT which are also surrounded by water in the water chamber, and eventually to the boiler stack. The flame from the burning gases essentially extends through the entirety of the central or morris tube 61a and on into the fire tubes FT to some extent to heat the water in the boiler and produce either hot water for heating purposes, or steam, as may be required. The passages 62, provided at circumferentally spaced intervals at the entrance to the boiler morris tube, communicate with a manifold 67 which is connected by a pipe 68 to the fan 57a. It is to be appreciated that there is only a limited combustion of the gases in the secondary chamber S, which is maintained at a temperature in the range 2200° to 2500 degrees F., because only sufficient oxygen is supplied via the air through passages 58a to support an incomplete combustion of the gases at this range of temperatures. It is in the secondary chamber S that the gases are sufficiently preheated to support the efficient final combustion which occurs in the boiler morris tube downstream from the passages 62 which, as indicated, supply more air than is required to support complete combustion of the gases entering burner tube 61a (which are the bulk of the gases generated).

As will later appear, the damper 59a is preferably controlled by a conventional stack analyzer SA (FIG. 7) which measures the amount of free oxygen going up the boiler stack, and adds or subtracts air flowing into the pipe 59 accordingly. Typically manifold 57 receives about 25 per cent of the air supplied by fan 57a and manifold 67 about seventy-five per cent. The analyzer SA is a conventional unit measuring the percentage of oxygen and transmitting an appropriate electrical signal to a programmable controller 57b which controls fan 57a and runs it at a speed to maintain the stack free oxygen content at about a target two percent. Typically, this means about twenty-five per cent excess air is present at passage 62, in terms of that required for complete combustion of the gases. Suitable analyzers SA can be obtained from Westinghouse Corporation or from Thermax Company, a division of Ametek, Inc.

The bed B in the primary chamber P is a continually radially outwardly shifting bed due to the constant supply of material to the central portion thereof, and this agitation tends to prevent rat-holing and the deleterious effects thereof. By rat-holing is meant the burning of passages from the periphery of the bed into the core of the bed. The restricted supply of air from chambers 41, 42 and 43 is a factor in preventing rat-holing, and this supply of air is closely monitored to prevent this effect.

At the exterior edges of the bed supporting table 37, the bed material is basically an ash which has been formed from the combustion of the radially shifting outer layer of the bed B which is continually occurring and, from time to time, this ash must be removed from the primary chamber P. Provided in the floor 14 of the chamber, is an ash discharge opening 69 which is closed by a door 70 during normal operation of the system. The door 70 may be operated by a suitable, manually controlled hydraulic or air cylinder 71 that swings it along the arc a shown in FIG. 1 about its pivot 72 to and from closed position. Provided beneath the opening 69, is a discharge chute 73 leading to the lower end of an enclosed ash conveyor, generally designated 74, which in turn leads to a discharge chute 75. Provided in the completely sealed conveyor enclosure 74a of conveyor 74, is an auger conveyor 76 consisting of a shaft 77 and a spiral conveyor flight 78 which extends down into the lower end of the conveyor 74 below the chute 73. The lower end of the chute 73 and the conveyor enclosure 74 are filled with a quenching fluid such as water, to a level such as shown at 79, so that smoldering and spark-laden ash which is swept through the opening 69 is received by the liquid body 79. When manually controlled motor-driven conveyor 76 is operated, the ash is removed in the form of a cooled slurry which will not create safety problems in the plant.

Provided to move the ash to the opening 69 when this becomes necessary, are circumferentially spaced paddle members generally designated 80 which are constructed as shown in FIGS. 2 and 6 particularly. The paddle members 80 include base portions 80a which, at circumferential intervals, are welded to an annular band 81 having a series of sprocket teeth openings 82 provided therein over its periphery. The paddles 80 further comprise generally radial front walls 83, generally inwardly and rearwardly sloping walls 84, and rear walls 85. One of them, as shown in FIG. 2 and 6, includes an arm member 86 which bolts to the interior of the wall 84 of the paddle and has a generally radially extending scraper arm 87 extending inwardly and forwardly in the direction of rotation b of the band 81 to scrape the sand and dirt, which in minimal proportion comes in with the biomass material from the table 37, to the exterior of the table along with any remaining lighter ash, which has, for the most part, been displaced off the table and onto the floor 14 of the primary chamber P surrounding the table by the moving mass of the bed B.

The band 81 is driven by a series of circumferentially spaced sprockets 88 which are provided on shafts 89 (FIGS. 5 and 6). Two of the shafts 89 have lower sprockets 90 which are directly driven by hydraulic motors 91 and 91a by means of sprockets 92 on the output shafts 93 of the motors 91 and 91a and chains 93a which are trained around the sprockets 90 and 92. The other two sprockets 88 are driven by the directly driven sprockets 88 via sprockets 94 and 96 and the chains 95 which are trained therearound. Chains 95 train around the sprockets 96 provided on shafts 89. Housings 99 are provided for the sprockets 88 to seal the air chambers 41 and 42 and prevent the entrance of air. For this purpose, where necessary, the annular walls 47, 39 and 46 are shortened at circumferential intervals to fit over and weld to the housings 99, as shown in FIG. 6.

As FIG. 4, directed to the primary chamber air supply system, particularly indicates, a positive displacement, high volume, low pressure air pump, generally designated 100, is provided to deliver air under a pressure in the range of about 2 P.S.I. to a pair of separate supply ducts 101 and 102. The duct 102 supplies air to the manifolds 54 and 55 via supply pipes 52 and 53, respectively, which incorporate the usual manual or motor-operated orifice controlling valves V. The manifold line 101 supplies the pipes 48, 49 and 50 which supply the manifolds 41–43 via manual or motor-operated orifice restricting valves V. Each of the conduits 101 and 102 is controlled by a motor controlled revolvable damper 105 and 106, respectively, fixed respectively on control shafts 105a and 106a whose rotation to adjust the degree of opening of dampers 105 and 106 are controlled.

The position of damper 105 is controlled by the load demand and, in the case of the fire tube boiler which has been described, by the temperature of the water leaving the boiler B-1, via an electric motor or the like 108 controlled by another programmable controller 109 which is connected to a boiler thermocouple 110. When the temperature of the water in the boiler B-1 is less than a predetermined temperature as sensed by the thermocouple or other temperature control 110, the motor 108 opens the damper 105 sufficiently to furnish more air up through the chip bed supporting table 37 and bring the boiler water temperature back to the required temperature.

Upstream of the damper 105, is a supply pipe 111 leading from the conduit 101 to an opening 112 provided in the horizontal enclosure 19a to provide air under a pressure in the neighborhood of 2 P.S.I. to the feed conveyor upstream of the portion 19b thereof. Working in conjunction with the portion 19b, wherein the chips tend to pack tightly to restrict the backflow of smoke, the greater pressure of the air entering the enclosure 19 at 112 is functional to prevent backflow, because it is admitted at a considerably greater pressure than the pressure maintained in the primary chamber P. The off gases generated by the bed B are drawn upwardly rather than downwardly.

The operation of damper 106 is controlled by a primary chamber thermocouple, generally designated 113, which electrically connects to an electric motor 114 for driving the shaft 106a of the damper 106 via still another programmable controller 115. All of the programmable controllers are standard units of the type sold, for example, by Foxboro Corporation and Honeywell Company.

To control the operation of the feed conveyors 19 and 20, an elongate control rod 116, extending through an opening 117 in the wall of the primary chamber P, is pivotally mounted as at 118 on a bracket 118a and has its lower free end resting on the top of the bed B. The pivot post 118 is under the control of a conventional potentiometer control 118b (FIG. 7), such as manufactured by Allen Bradley Company or Honeywell, which controls the electric motor 118c driving the hydraulic pump P-1 which supplies the fluid to rotary hydraulic motors 23 and 36a to alter the speed of drive of the conveyor flights 22 and 26 and supply chips in a volume which will maintain the bed B at the correct height.

THE OPERATION

To start the generation system when the system is cold, the motors 23 and 36a are operated sufficiently to convey sufficient wood chips or the like to form the bed B. The pump motor 118c is energized to accomplish this. Then, a door (not shown) in the primary chamber P is opened and the primary chamber P is physically entered to permit a starting fluid, such as diesel oil or the like, to be applied over the exterior surface of the bed B formed. The saturated exterior chips, which contain considerable moisture, it will be recalled, are then lit in any acceptable manner. Over a period, sufficient heat is generated to pre-heat the refractory walls of the primary and secondary chambers. Enough air is supplied by pump 100 to the underneath annular chambers 41–43 to support flaming combustion at the upper surface of the bed B. The door in the primary combustion chamber P is left open so that there is sufficient air to also support the combustion of gases given off in the primary chamber P. At this stage, all of the gases given off are burned in the primary chamber to bring the chambers P and S up to temperature. There is no recirculation of gases through the bed. The secondary chamber S is heated by flame and the products of combustion proceeding into it from the primary chamber. Until the refractory reaches a predetermined temperature during start up, the programmable controllers 57b, 109 and 115 are manually over-ridden to close dampers 105 and open damper 106 to the desired degree by operating manual override switches SW-1, Sw-2 and SW-3 which are built into the controllers 109, 115, and 57b respectively, and permit the dampers to be operated independently of the system automatic controls. When the thermocouple 113 in the primary chamber wall indicates the primary chamber refractory wall has achieved the required operating temperature, the door in the manually primary chamber P is closed. The damper 106 is then released via switch SW-2 to the control of controller 115, to permit air to proceed past the damper 106 and to the manifold chambers 54 and 55. The volume of air supplied provides only enough oxidation of combustible gases in the primary chamber to maintain the refractories at the final operating temperature desired. At the same time the damper 105 is manually released to the control of controller 109 via switch SW-1 and the damper 59a is manually released to the control of controller 57b via switch Sw-3. Thereafter the system operates continuously automatically. The normal time required for start- up·is only about 1 ½ hours. During start-up and afterward, smoke has been prevented, by the chip-packing chamber 19b and the air supplied through orifice 112, from backing up in the conveyor 19.

With normal operation of the system and air being supplied to the chambers 41–43 via the damper 105, as required by the system under demand control, a greater volume of air is supplied to annular chamber 41 to support combustion at the deeper central portion of the bed. Less air is proportionately required in the chambers 42 and 43 because the depth of the pile at these locations is less. Enough air is supplied to support flaming combustion at the outer layer of the bed B, but insufficient air is supplied beyond that so that the interior of the bed B, below the outer surface, is only incompletely oxidized and gives off combustible gases in great volume. Since the bed B is continually being replenished, the chips work their way upwardly and outwardly to the outer surface of the bed B in a continuous manner and char as gases are released. They eventually fall off the perimeter of the table 37 as ash to the ash pit formed at the outer perimeter of the table on the floor 14 of the primary chamber.

The pressure of the air entering the chambers 41–43 is, as noted previously, sufficient to maintain the off gases of combustion in the lower pressure region of the primary chamber P above bed B, to mix there with air supplied through the passages 52 and 53 to manifolds 54 and 55 as they are drawn by suction or draft forces to and out the primary chamber outlet opening 51. Recirculation of the gases to the bed B is positively prevented to avoid undue combustion of them in the primary chamber. To prevent undue combustion of the chips inward of the exterior surface of the bed B, only sufficient combustion of the gases occurs in the upper end of the primary chamber P to maintain the temperature of the chamber at the desired level.

Air entering the passages 58a upstream of the cyclonic chamber S, provides for limited burning of the whirling gases in the cyclonic chamber 55 sufficient only to maintain the secondary chamber wall at the desired temperature at which fly ash hurled outwardly to the walls of the refractory on contact chamber S is consumed. The great proportion of the gases proceeds unburned to the throat 61 leading to the boiler B-1, where the air admitted through passages 66 is sufficient to support complete combustion of the unburned gases at temperatures in the neighborhood of 3000° F. at the entrance of the morris tube, in the morris tube from one end to the other, and on into the fire tubes.

Utilizing a three foot diameter stack some average stack discharge characteristics in typical runs were as follows:
stack temperature 373.5° to 401.8° F.
moisture content 23.6 to 27.5 per cent
per cent excess air averaging near 25 per cent Carbon monoxide, sulfur dioxide, carbon dioxide and particulate content levels were very acceptable. The generated gas burns very cleanly and environmental clean-up equipment such as scrubbers are unnecessary.

From time to time, i.e., every three days or so, ash and foreign material such as dirt, sand and foreign objects, are cleaned from the floor 14 via the ash opening 69. It is not necessary to shut down the system to accomplish this and combustible gases can continue to be produced during this operation because the ash pit essentially is sealed by the liquid at 79.

In the operation of the ash disposal system, the sprockets 88 are revolved in the manner indicated to move the band 81 in the direction b, and it is the paddle surfaces 83 which move the material forwardly to the opening 69. Generally, the lower level of the paddles 80 is such that a layer of ash and other material about 2 inches in depth is maintained on the floor 14 of the chamber, and it is the ash and other material, which builds above this point, which is pushed into the discharge opening 69. By leaving a layer of material on the floor 14 of the primary chamber P in this manner, an insulating effect is provided for the floor 14.

The system does not, when operating with the wood chip material indicated, normally form clinkers with other types of biomass material. If clinkers should be formed, they will tend to be broken up by the inclination of wall 84 and the squeezing or wedging of the clinker material between the wall 84 and the interior wall of the primary chamber P. The function of the scraper arm 87 has previously been mentioned along with its angle of inclination which extends inwardly as far as the partition 46a provided in the middle of chamber 42.

Generally, operation of the ash disposal system for a period of five minutes will remove all of the ash and foreign material collected at the bottom of the chamber on floor 14, and will similarly, via arm 87, remove material from the perimetral edge of the table 37 so that it can be pushed to the opening 69.

The feed of the chip feed conveyor system during normal operation of the gasifying system is controlled solely by the height of the bed B, as previously mentioned, and proceeds continuously at the rate required.

Although preferred embodiments of the invention have been illustrated in the accompanying drawings and described in the foregoing detailed description, it will be understood that the invention is not limited to the embodiments disclosed, but is capable of numerous rearrangements, modifications and substitutions of parts and elements without departing from the spirit of the invention which is defined in the following claims.

What is claimed is:

1. A hot gas generation system for producing combustible gases for a burner from particulate solid organic biomass material comprising:
   a. an enclosed, biomass-heating primary chamber including a side wall, top wall, and a bottom closure with a perforate table for supporting a bed of biomass material, said table having a generally central opening;
   b. a conveyor assembly, including an imperforate tubular housing depending from said opening, and material advancing mechanism operable to continuously force biomass material upwardly through said housing and opening to maintain the biomass material in a generally frustroconically shaped body in which newly supplied material is pushed upwardly and displaces other material outwardly toward the outer periphery of the body;
   c. a series of separate, generally annular, air manifolds contiguously under said table surrounding said tubular housing and communicating with the bottom of said table, said series comprising a centralmost manifold concentrically surrounded by at least one outer manifold;
   d. an air supply control system means for maintaining a partially oxygen starved atmosphere in said primary chamber and including means separately supplying a different volume of air to said centralmost manifold than to said outer manifolds; the velocity of said air being below a bed fluidizing velocity;
   e. an effluent gas discharge passage in said chamber near the upper end thereof for egressing hot gases given off by said bed;
   f. means creating a secondary cyclonic heating chamber, having an annular wall downstream from said gas discharge passage into which said off gases are received from said passage and whirled in a spiraling path, to cause entrained particulates to be centrifugally contacted by said annular wall;
   g. means for maintaining the cyclonic heating chamber with a partially oxygen starved atmosphere and at a limited temperature to combust entrained material contacted by said wall, without combusting a major portion of said off gases;
   h. passage means from the secondary heating chamber for communicating with the burner to supply hot combustible gases thereto;
   i. means for preventing the back up of smoke and off-gases through said conveyor assembly; and
   j. means for removing ash from the primary chamber at the perimeter of said table.

2. The system of claim 1 wherein said means for removing ash includes a series of circumferentially spaced paddles in said primary chamber outboard of said table and adjacent the side and bottom closure of the primary heating chamber; an endless member connects said paddles; an ash-passing opening is provided in said chamber; means is provided for selectively driving said endless member in a direction of rotation to cause said paddles to travel in a rotary path between said table and side wall to move ash to said ash-passing opening; and ash collection means is connected with said ash-passing opening.

3. The system of claim 2 wherein said endless member comprises a band, having circumferentially spaced sprocket openings therein, supported on said table perimeter for rotation, and a series of sprockets, with teeth extending into said sprocket openings, are mounted for rotation inboard of the perimeter of said table at circumferentially spaced positions under said table.

4. The system of claim 3 wherein said bottom closure has a portion outboard of said table disposed at a spaced distance below said table, said ash passing opening is in said outboard portion, and said paddles comprise generally radially extending walls and generally tangentially extending walls extending radially inwardly and rearwardly from said radially extending walls with respect to the direction of travel of said paddles.

5. The system of claim 2 wherein at least one of said paddles has an inwardly extending upper arm extending inwardly above said table generally perpendicularly to the generally tangentially extending wall of said one paddle to scrape material from the perimetral portion of the table when said paddles are moved.

6. The system of claim 2 wherein said ash-passing opening leads to a cooling liquid containing ash pit, and ash conveyor means communicates with said ash pit to remove said ash as a slurry therefrom.

7. The system of claim 1 wherein said effluent gas passage includes a duct leading from said primary chamber and said means creating said cyclonic chamber includes a cylindrical body having an axis extending horizontally at right angles to said effluent gas passage duct, said effluent gas passage duct extending into one end of said cylindrical body offset from said axis thereof, and said means for maintaining the temperature in said cyclonic chamber comprises an air ingress passage in said effluent gas passage duct upstream from said cylindrical body.

8. The system of claim 7 wherein an air ingress passage is provided in the passage means leading from the cyclonic heating chamber to said burner.

9. The system of claim 1 wherein said conveyor mechanism includes an enclosed, generally horizontally disposed conveyor leading to said tubular housing extending up into said table opening; and said means for preventing the back up of smoke and off gases includes a tapering, divergent, open and non-obstructed tube portion between said horizontally disposed conveyor and tubular housing which is packed with biomass material.

10. The system of claim 1 wherein said preventing means further includes an air passage leading into said horizontally disposed conveyor upstream from said tube portion, and means for introducing air thereto under a pressure greater than the pressure maintained in said enclosed primary heating chamber by said air control system means.

11. The system of claim 10 wherein a vertically disposed supply hopper leads from above to said generally horizontally disposed conveyor, and a rotatable paddle type valve for transferring biomass material to said hopper is mounted in a tubular biomass material supply member and has sufficient paddles to seal said supply member and regardless of its position of rotation substantially prevent the flow of air.

12. The system of claim 1 including means sensitive to the demand for combustible gas for continuously regulating the air supply control system means to automatically supply air under varied volumes to said air manifold means.

13. A hot gas generation system for producing combustible gases for a boiler burner from particulate, solid, organic, biomass material in combination with a boiler having a burner leading to a boiler stack comprising:
  a. an enclosed, biomass- heating primary chamber including a side wall, top wall, and a bottom closure with a perforate table for supporting a bed of biomass material, said table having a generally central opening;
  b. a conveyor assembly, including a tubular housing depending from said opening, and material advancing mechanism operable to continuously force biomass material upwardly through said housing and opening to maintain the biomass material in a generally fructroconically shaped body in which newly supplied material is pushed upwardly and displaces other material outwardly toward the outer periphery of the body;
  c. air manifold measn contiguously under said table surrounding said tubular housing and communicating with the bottom of said table;
  d. an air supply control system means for maintaining a partially oxygen starved atmosphere in said primary chamber and including means supplying air to said manifold means;
  e. an effluent gas discharge passage leading from said primary chamber near the upper end thereof for egressing hot gases given off by said bed;
  f. means creating a secondary cyclonic heating chamber, having an annular wall downstream from said gas discharge passage into which said off gases are received from said passage and whirled in a spiraling path to cause entrained particulates to be centrifugally contacted and combusted by said annular wall;
  g. means for maintaining the cyclonic heating chamber with a partially oxygen starved atmosphere and at a limited temperature which combusts entrained material contacted by said wall, without combusting a major portion of said off gases;
  h. passage means leading from the secondary heating chamber for communicating with the burner to supply hot combustible gases thereto;
  i. means for preventing the back up of smoke and off-gases through said conveyor assembly;
  j. means for removing ash from the primary chamber; and
  k. means sensitive to the demand for combustible gas for continuously regulating the air supply control system means to automatically supply air under varied volumes to said air manifold means.

14. The system of claim 13 wherein said means sensitive to the demand for combustible gas comprises a sensor for monitoring the temperature of the fluid heated by the boiler.

15. The system of claim 13 wherein said air supply control means includes duct means for supplying air to said chamber above said table and means sensitive to the temperature of the atmosphere in the upper end of said primary chamber automatically regulates the supply of air to said duct means.

16. The system of claim 13 wherein separate air supply manifold means supplies air to said secondary chamber through said gas effluent discharge passage between said primary and secondary chambers and to said passage means leading from the secondary chamber in a ratio in the neighborhood of twenty-five per cent to seventy-five per cent respectively, and means sensitive to the boiler stack emission involving oxygen use regulates the supply of air to said separate air supply manifold means.

17. A hot gas generation system for producing combustible gases for a burner from particulate solid organic biomass material comprising:
   a. an enclosed biomass-heating primary chamber including a side wall, top wall, and a bottom closure with a perforate table for supporting a bed of biomass material, said table having a generally central opening;
   b. a conveyor assembly, including a tubular housing depending from said opening, and material advancing mechanism operable to continuously force biomass material upwardly through aid housing and opening to maintain the biomass material in a generally frustroconically shaped body in which newly supplied material is pushed upwardly and displaces other material outwardly toward the outer periphery of the body;
   c. air manifold means contiguously under said table surrounding said tubular housing and communicating with the bottom of said table;
   d. an air supply control system means for maintaining a partially oxygen starved atmosphere in said primary chamber and including means supplying air to said manifold means;
   e. an effluent gas discharge passage in said primary chamber near the upper end thereof for egressing hot gases given off by said bed;
   f. means creating a secondary cyclonic heating chamber, having an annular wall downstream from said gas discharge passage into which said off gases are received from said passage and whirled in a spiraling path to cause entrained particulates to be centrifugally contacted by said annular wall;
   g. means for maintaining the cyclonic heating chamber with a partially oxygen starved atmosphere and at a limited temperature which combusts entrained material contacted by said wall, without combusting a major portion of said off gases;
   h. passage means from the secondary heating chamber for communicating with the burner to supply hot combustible gases thereto;
   i. means for preventing the back up of smoke and off-gases through said conveyor assembly;
   j. said primary chamber having an ash discharge opening adjacent to and radially outboard of the perimeter of said table;
   k. an endless drive band outboard of and radially supported by said table;
   l. a series of circumferentially spaced, generally radially outwardly extending paddles fixed to said band; and
   m means for selectively driving said band in a direction of travel to cause said paddles to move ash to said ash discharge opening.

18. The system of claim 17 wherein said paddles comprise generally radially extending walls and generally tangentially extending walls extending radially inwardly and rearwardly from said generally radially extending walls with respect to the direction of travel of said band and paddles; and one of said paddles has a radially inwardly extending table scraper extending inwardly adjacent to and above said table generally perpendicularly to said generally tangentially extending wall of said one of said paddles.

19. A hot gas generation system for producing combustible gases for a burner from particulate solid organic biomass material comprising:
   a. an enclosed, biomass-heating primary chamber including a side wall, top wall, and a bottom closure with a perforate table for supporting a bed of biomass material, said table having a generally central opening;
   b. a conveyor assembly, including a first imperforate tubular housing depending from said opening and a second tubular housing leading generally laterally to connect to the lower end thereof, and material advancing mechanism operable in said tubular housings to continuously force biomass material laterally in said second housing and upwardly through said first housing and table opening to maintain the biomass material in a generally frustroconically shaped body in which newly supplied material is pushed upwardly and displaces other material outwardly toward the outer periphery of the body;
   c. air manifold means contiguously under said table surrounding said tubular housing and communicating with the bottom of said table;
   d. an air supply control system means for maintaining a partially oxygen starved atmosphere in said primary chamber and including means separately supplying air to said manifold means;
   e. an effluent gas discharge passage in said primary chamber near the upper end thereof for egressing hot gases given off by said bed;
   f. means creating secondary cyclonic heating chamber, having an annular wall downstream from said gas discharge passage into which said off gases are received from said passage and whirled in a spiraling path to cause entrained particulates to be centrifugally contacted by said annular wall;
   g. means for maintaining the cyclonic heating chamber with a partially oxygen starved atmosphere and at a limited temperature which combusts entrained material contacted by said wall, without combusting a major portion of said off gases;
   h. passage means from the secondary heating chamber for communicating with the burner to supply hot combustible gases thereto;
   i. means for preventing the back up of smoke and off-gases through said conveyor assembly, said means comprising a tapering portion of said second housing adjacent to said first housing into which the biomass material packs to form a slug of material substantially without gas flow passages and an air inlet upstream therefrom with means for introducing air under a pressure greater than that maintained in said primary chamber; and
   j. means for removing ash from the primary chamber.

20. In a hot gas generation process for producing combustible gases for a burner from particulate solid organic biomass material, with a system comprising an enclosed, biomass-heating primary chamber including a side wall, top wall, and a bottom closure with a perforate table for supporting a bed of biomass material, said table having a generally central opening; a conveyor assembly including a tubular housing depending from said opening and material advancing mechanism operable to continuously force biomass material upwardly through said housing and opening to create and maintain the biomass material in a generally frustroconical shaped body in which newly supplied material is pushed upwardly and displaces other material outwardly toward the outer periphery of the body; a series of separate, generally annular, air manifolds contiguously under said table surrounding said tubular housing and communicating with the bottom of said table, said series comprising a centralmost manifold concentrically surrounded by at least one outer manifold; an air supply control system means for maintaining a partially oxygen-starved atmosphere in said primary chamber; an effluent gas discharge passage in said primary chamber near the upper end thereof for egressing hot gases given off by said bed; means creating a secondary cyclonic heating chamber, having an annular wall downstream from said gas discharge passage into which said off gases are received from said passage and whirled in a spiraling path; means for maintaining the cyclonic heating chamber with a partially oxygen-starved atmosphere and at a limited temperature lower than a temperature which would combust a major portion of said off gases; passage means from the secondary heating chamber for communicating with the burner to supply hot combustible gases thereto; and means for preventing the back up of smoke and off-gases through said conveyor assembly; the steps of:
  a. supplying air to said central manifold in a volume to maintain the exterior surface of the central portion of said bed flaming while the smoldering interior thereof remains incompletely combusted and egressing off gases; and
  b. supplying air to said outer manifold in a lesser volume than to said central manifold to maintain the exterior surface of a portion of said bed surrounding said central portion flaming while the interior thereof remains incompletely combusted and egressing off gases.

21. The process of claim 20 wherein said effluent gas passage includes a duct leading from said primary chamber and said means creating said cyclonic chamber includes a cylindrical body having an axis extending at right angles to said effluent gas passage duct, said effluent gas passage duct extending into one end of said cylindrical body offset from said axis thereof, and said means for maintaining the temperature in said cyclonic chamber comprises an air ingress passage in said effluent gas passage duct upstream from said cylindrical body, said wall of the secondary chamber is maintained at a temperature to combust fly ash entrained in said whirling gases upon contact; and said fly ash is centrifugally whirled to said wall of the secondary chamber and combusted on contact.

22. In a hot gas generation process for producing combustible gases for a burner from particulate solid organic biomass material, with a system comprising an enclosed, biomass-heating primary chamber including a side wall, top wall, and a bottom closure with a perforate table for supporting a bed of biomass material, said table having a generally central opening; a conveyor assembly including a tubular housing depending from said opening and material advancing mechanism operable to continuously force biomass material upwardly through said housing and, table opening to maintain the biomass material in a generally frustroconical shaped body in which newly supplied material is pushed upwardly and displaces other material outwardly toward the outer periphery of the body; air manifold means contiguously under said table surrounding said tubular housing and communicating with the bottom of said table; an air supply control system means for only maintaining a partially oxygen-starved atmosphere in said primary chamber and including means supplying air to said manifold means; an effluent gas discharge passage in said primary chamber near the upper end thereof for egressing hot gases given off by said bed; means creating a secondary cyclonic heating chamber, having an annular wall downstream from said gas discharge passage into which said off gases are received from said passage and whirled in a spiraling path; means for maintaining the cyclonic heating chamber with a partially oxygen-starved atmosphere and at a limited temperature to essentially combust any entrained material contacted by said wall, while lower than a temperature which would combust a major portion of said off gases; passage means from the secondary heating chamber for communicating with the burner to supply hot combustible gases thereto; means for preventing the back up of smoke and off-gases through said conveyor assembly; sensing means for monitoring the temperature of the fluid heated by the burner connected with said air supply control system; and means for removing ash from the primary chamber; the steps of:
  a. sensing the temperature of the fluid heated by the burner; and
  b. supplying more or less air to said manifold means via said air supply control system dependant on the temperature sensed by said sensing means.

23. In a hot gas generation process for producing combustible gases for a burner from particulate solid organic biomass material, with a system comprising an enclosed, biomass-heating primary chamber including a side wall, top wall, and a bottom closure with a perforate table for supporting a bed of biomass material, said table having a generally central opening; a conveyor assembly including a first tubular housing depending from said opening, and a second tubular housing leading generally laterally to connect to the lower end thereof; material advancing mechanism operable in said tubular housings to continuously force biomass material laterally in said second housing and upwardly through said first housing and table opening to maintain the biomass material in a generally frustroconical shaped body in which newly supplied material is pushed upwardly and displaces other material outwardly toward the outer periphery of the body; air manifold means contiguously under said table surrounding said tubular housing and communicating with the bottom of said table; an air supply control system means for maintaining a partially oxygen-starved atmosphere in said primary chamber and including means supplying air to said manifold means; an effluent gas discharge passage in said primary chamber near the upper end thereof for egressing hot gases given off by said bed; means creating a secondary cyclonic heating chamber, having an annular wall downstream from said gas discharge passage into which said off gases are received from said passage and whirled in a spiraling path; means for maintaining the cyclonic heating chamber at a limited temperature to essentially combust any entrained material contacted by said wall, while lower than a temperature which would combust a major portion of said off gases; passage means from the secondary heating chamber for communicating with the burner to supply hot combustible gases thereto; means for preventing the back up of smoke and off-gases through said conveyor assembly comprising a tapering portion of said second housing and an air inlet upstream therefrom with means for introducing air thereto; and means for removing ash from the primary chamber; the steps of:

a. supplying air to said inlet at a pressure greater than that maintained in said primary chamber; and
b. packing the biomass material in said tapered portion to form a slug substantially without gas flow passages.

* * * * *

UNITED STATES PATENT AND TRADEMARK OFFICE
CERTIFICATE OF CORRECTION

PATENT NO. : 5,138,957
DATED : August 18, 1992
INVENTOR(S) : Norval K. Morey and Robert J. Engler It is certified that error appears in the above-identified patent and that said Letters Patent is hereby corrected as shown below:

Column 2, line 49, change "chaber" to -- chamber --.

Column 5, line 8, change "7" to -- 37 --.

Column 6, line 52, change "sam" to -- same --.

Column 10, line 43, change "I" to -- 1 --.

Column 14, line 32, change "measn" to -- means --.

Column 16, line 1, insert a period after "m".

Signed and Sealed this

Seventeenth Day of August, 1993

Attest:

BRUCE LEHMAN

Attesting Officer

Commissioner of Patents and Trademarks